United States Patent [19]

Grob et al.

[11] Patent Number: 4,890,548
[45] Date of Patent: Jan. 2, 1990

[54] DEEP FAT FRYING APPARATUS HAVING AN IMPROVED COOKING FLUID FILTRATION SYSTEM

[75] Inventors: James T. Grob; John M. Kinch, both of Shreveport, La.

[73] Assignee: The Frymaster Corporation, Shreveport, La.

[21] Appl. No.: 168,164

[22] Filed: Mar. 15, 1988

[51] Int. Cl.⁴ .............................................. A47J 37/12
[52] U.S. Cl. ........................................ 99/408; 99/330; 99/418
[58] Field of Search .................. 99/327–330, 99/331, 337, 403, 408, 418, 342; 219/437, 509, 327; 210/184–186, 175, DIG. 8

[56] References Cited

U.S. PATENT DOCUMENTS

| | | | |
|---|---|---|---|
| 4,195,667 | 4/1980 | Moore et al. | 99/408 X |
| 4,324,173 | 4/1982 | Moore et al. | 99/330 |
| 4,444,095 | 4/1984 | Anetsberger et al. | 99/408 |
| 4,623,544 | 11/1986 | Highnote | 99/330 X |
| 4,643,824 | 2/1987 | Akazawa et al. | 210/167 |
| 4,684,412 | 8/1987 | Fritzsche | 99/330 X |

Primary Examiner—Timothy F. Simone
Attorney, Agent, or Firm—Hubbard, Thurman, Turner & Tucker

[57] ABSTRACT

A deep fat fryer structure includes a floor mounted housing having an upper internal portion in which a side-by-side pair of large capacity metal frypots are operatively supported, each of the frypots having an upper, heated cooking portion from which an unheated cold well depends. Cooking fluid may be drained from the wells for filtration purposes by a valved drainage conduit system having an open outlet end. Filtered cooking fluid may be returned to the upper frypot portions through a valved supply conduit system having a flexible inlet end portion extendable below the frypots. An open-topped, wheel-supported container may be rolled into the housing directly beneath the frypots to receive cooking fluid drained therefrom, and has a cooking fluid filtration element supported on its bottom wall directly over a drain sump depending therefrom. Externally mounted on a front side portion of the container is a motor-driven pump with an inlet communicating with the drain sump, and an outlet provided with a quick-disconnect fitting securable to the flexible inlet end of the supply conduit system. During pump operation, cooking fluid is drained from a selected frypot into the container, filtered therein, and then pumped upwardly into the selected frypot. In this manner, the entire filtration system requires no more floor space than that occupied by the frypot housing, and the container may be rolled outwardly therefrom for cleaning purposes and to provide very convenient access to the motor-driven pump.

8 Claims, 2 Drawing Sheets

DEEP FAT FRYING APPARATUS HAVING AN IMPROVED COOKING FLUID FILTRATION SYSTEM

BACKGROUND OF THE INVENTION

The present invention relates generally to cooking equipment and, in a preferred embodiment thereof, more particularly provides deep fat frying apparatus having an improved cooking fluid filtration system.

The frying in commercial cooking facilities of various food items such as french fries, breaded chicken and fish and the like is conventionally performed using fryer structures that typically comprise at least two large capacity metal frypots operatively supported within an upper portion of a suitable housing. Each of the frypots has a heated upper portion, in which the food is actually fried in a cooking fluid such as oil or melted lard, and an elongated, unheated "cold well" portion which depends from the upper frypot portion and is designed to receive and retain food bits that inevitably fall from the frier racks. The relatively cooler temperature of the cooking fluid in the unheated wells tends to prevent the fallen food particles from burning and thereby unduly hastening the need to replace the cooking fluid in the frypots with a fresh supply.

It is well known that the useful life of a given batch of cooking fluid may be further extended by periodically draining the oil, filtering the particulate food matter from the drained fluid, and then returning the cleansed fluid to its frypot for further food frying use. Heretofore, the equipment needed to effect this very advantageous filtration process has required a considerable amount of additional operation and/or storage floor space beyond that occupied by the fryer housing, the housing floor space normally being only somewhat greater than the vertically projected floor area of the large capacity frypots.

As an example, it has been conventional practice to position the filtration and associated pumping equipment in a separate floor mounted filtration housing built onto one side of the frypot housing. Not only does this require a significant amount of additional floor space, which is usually at a high premium in most commercial cooking facilities such as fast food restaurants, but also inhibits the ability to add additional frypot sections to the existing frypot housing should business expand or frying needs otherwise increase.

It is accordingly an object of the present invention to provide deep fat frying apparatus, having an improved cooking fluid filtration system, which eliminates or minimizes the above-mentioned and other problems, limitations and disadvantages typically associated with conventional deep fat frying structures and their floor space-consuming fluid filtration systems.

SUMMARY OF THE INVENTION

In carrying out principles of the present invention, in accordance with a preferred embodiment thereof, deep fat fryer apparatus is provided which has an improved cooking fluid filtration system that requires no additional floor space, is of an economical and quite simple construction, provides improved operational safety, and further provides ready access to its filtering and pumping components for maintenance and cleaning purposes. The apparatus includes a floor mounted housing having an open lower end, a lower internal portion, an upper internal portion directly above and in communication with the lower internal portion, and means for defining a horizontally facing access opening to the lower internal housing portion, the access opening extending from the floor to the upper end of the lower internal housing portion.

A pair of large capacity metal frypots are operatively supported side-by-side within the upper internal housing portion, each of the frypots having a heated upper portion, in which food is supported on a rack or the like and fried in a cooking fluid such as oil or melted lard, and an elongated, unheated "cold well" portion depending therefrom. As used herein with reference to each frypot, the term "large capacity" means that the frypot is capable of holding the melted product of a fifty pound block of cooking lard (the standard size commercially available) or an equivalent volume of cooking oil.

To periodically drain the cooking fluid from a selected one of the frypots for filtration purposes, a suitably valved drainage conduit system is disposed within the upper internal housing portion and has an inlet portion operatively connected to each of the frypot wells, and a discharge opening positioned between and slightly below the wells. Return of filtered cooking fluid to the drained frypot is effected through a suitably valved supply conduit system disposed in the upper internal housing portion and having an outlet portion connected to the upper frypot portions, and a flexible inlet end portion extendable into the lower internal housing portion adjacent the aforementioned access opening.

The improved cooking fluid filtration system of the present invention includes a wheel-supported cooking fluid receiving container having a holding capacity at least large enough to receive the entire cooking fluid contents of one of the frypots. The fluid receiving container has a top opening, a bottom wall from which a drain sump depends, a front side portion, and a rear side portion. A cooking fluid filter element is operatively positioned on the bottom wall of the container and extends over the open upper end of the drain sump. A filtration pump and its associated electric drive motor are externally mounted on a front side portion of the container for movement with the container, the pump having an inlet communicating with the interior of the drain sump, and an outlet having a quick disconnect fitting operatively secured thereto.

To ready the fryer apparatus for the draining and filtration of its frypot cooking fluid, the fluid receiving container is simply rearwardly rolled through the access opening into the lower internal housing portion to position the container directly beneath the frypots, position the top opening of the container beneath the outlet of the drainage conduit system, and position the pump outlet adjacent the inlet end portion of the supply conduit system. The flexible inlet end portion of the supply conduit system is conveniently bendable to one side or otherwise to permit unimpeded entry of the container into the lower internal housing portion. With the fluid receiving container conveniently tucked away within the housing beneath the frypot wells, a suitable electrical connection is made to the filtration pump supported on the container, and the inlet end of the supply conduit system is rapidly connected to the pump outlet using its quick-disconnect fitting.

Cooking fluid from within a selected one of the frypots is then drained into the receiving container through the valved drainage conduit system, the received fluid flowing downwardly through the filter member into the drain sump on the lower wall of the container, the filter element removing from the received fluid the particulate food matter suspended therein. Filtered cooking fluid entering the drain sump is pumped upwardly into the drained frypot through the valved supply conduit system, thereby readying the refilled frypot for a subsequent cooking cycle with its now essentially food particulate-free batch of cooking fluid. The cooking fluid in the other frypot may then be drained, filtered and returned in a similar fashion.

To further enhance the overall filtering process, a conventional drop-in food dislodgment shower device is provided that is adapted to be removably secured within the open upper end of the frypot to which cooking fluid is being returned by the receiving container pump. The shower device has an inlet portion which may be quick-connected to an outlet of the supply conduit system at its entry to the frypot, and a discharge header portion configured to extend around the inner periphery of the frypot adjacent its open upper end. Cooking fluid returned to the frypot through the supply conduit is forced downwardly through small, spaced discharge openings formed around the undersurface periphery of the header, thereby forming a series of downwardly directed cooking fluid jets. These jets sweep along the vertical interior side surfaces of the frypot's cooking portion and dislodge adhered food particles therefrom so that they can be flowed to the filter element in the receiving container.

When the cooking fluid in either of the frypots has reached the end of its useful cooking life, it may simply be drained into the fluid receiving container without being returned to the frypot. The filtration pump may then be rapidly disconnected from the inlet end of the supply conduit system, and from its electrical supply, and then rearwardly rolled outwardly through the housing access opening and away from the housing so that the used cooking fluid can be dumped, the container cleaned, and the filter element replaced. After this task is completed, the container is simply rolled back into the frypot housing and the pump rapidly reconnected to its electrical supply and to the internal supply conduit system as previously described.

It can readily be seen that, due to the wheel-mounted fluid receiving container and associated fluid pump apparatus which are uniquely positionable directly beneath the frypots wholly within their supporting housing, the entire cooking fluid pumping and filtration system requires no additional floor space beyond that occupied by the frypot housing. This filtration system positioning frees the previously required additional floor space for additional cooking apparatus. It also permits greater flexibility in adding additional frypot sections to the frypot housing since such additional section or sections may now be built onto either side of such housing. In the event that this is done, it is a simple matter to internally extend the drainage and supply conduit systems to the new frypot section or sections.

Moreover, it can also be seen that the mounting of the filtration pump on the movable fluid receiving container, together with the quick disconnect fitting carried by the pump outlet, permits the critical pumping apparatus to be rapidly moved outwardly from the frypot housing to provide very easy access to the pump and its associated drive motor for maintenance, repair and replacement purposes. The wheel-supported fluid receiving container, and its associated filtration and pumping apparatus, can be easily and relatively economically constructed from readily available standard components, and provides for simple yet quite effective filtration of the recycled cooking fluid.

DETAILED DESCRIPTION

Figure 1:
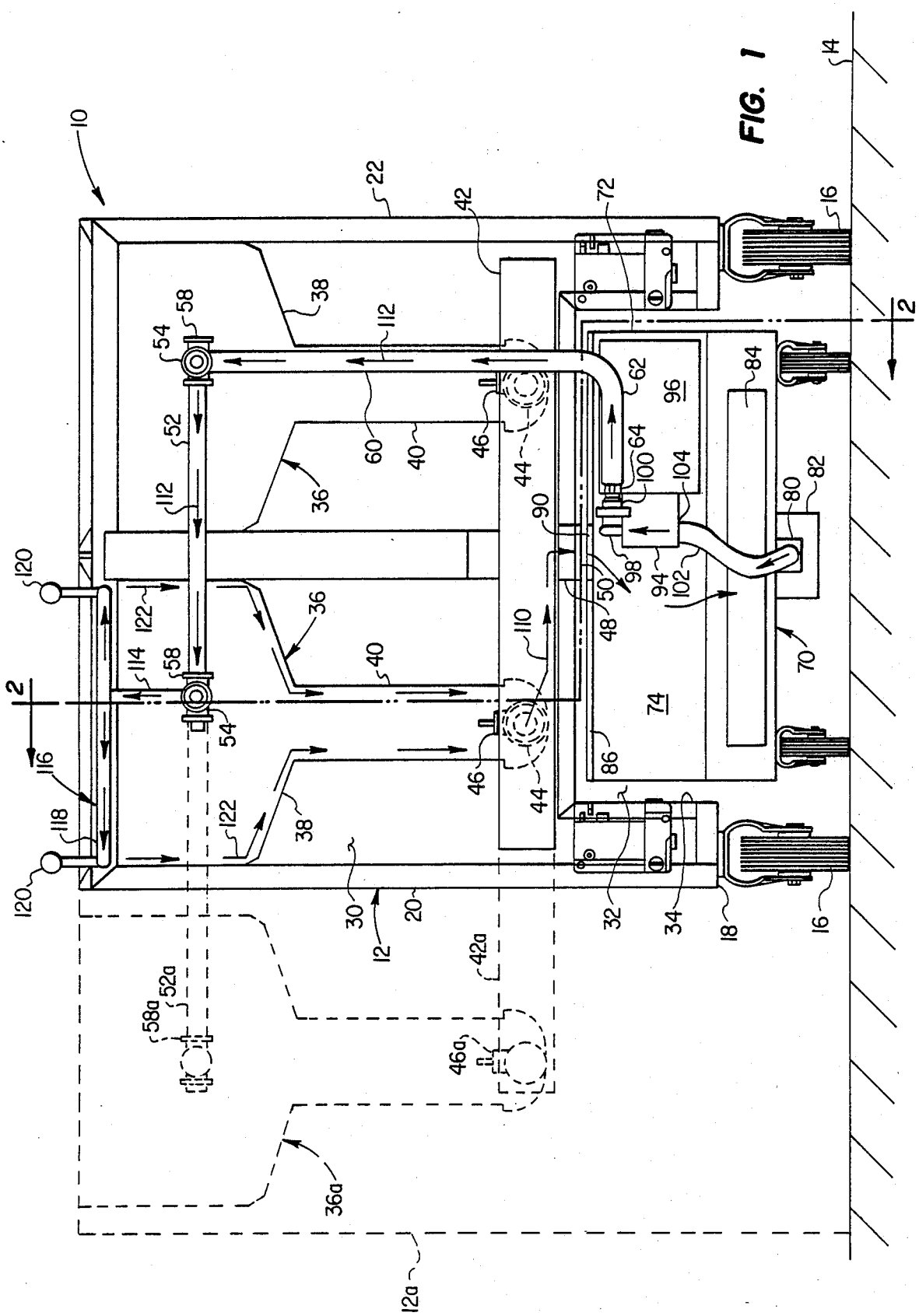
FIG. 1 is a simplified, somewhat schematic front cross-sectional view through a deep fat fryer apparatus which embodies principles of the present invention and is provided with an improved cooking fluid filtration and pumping system.
Figure 2:
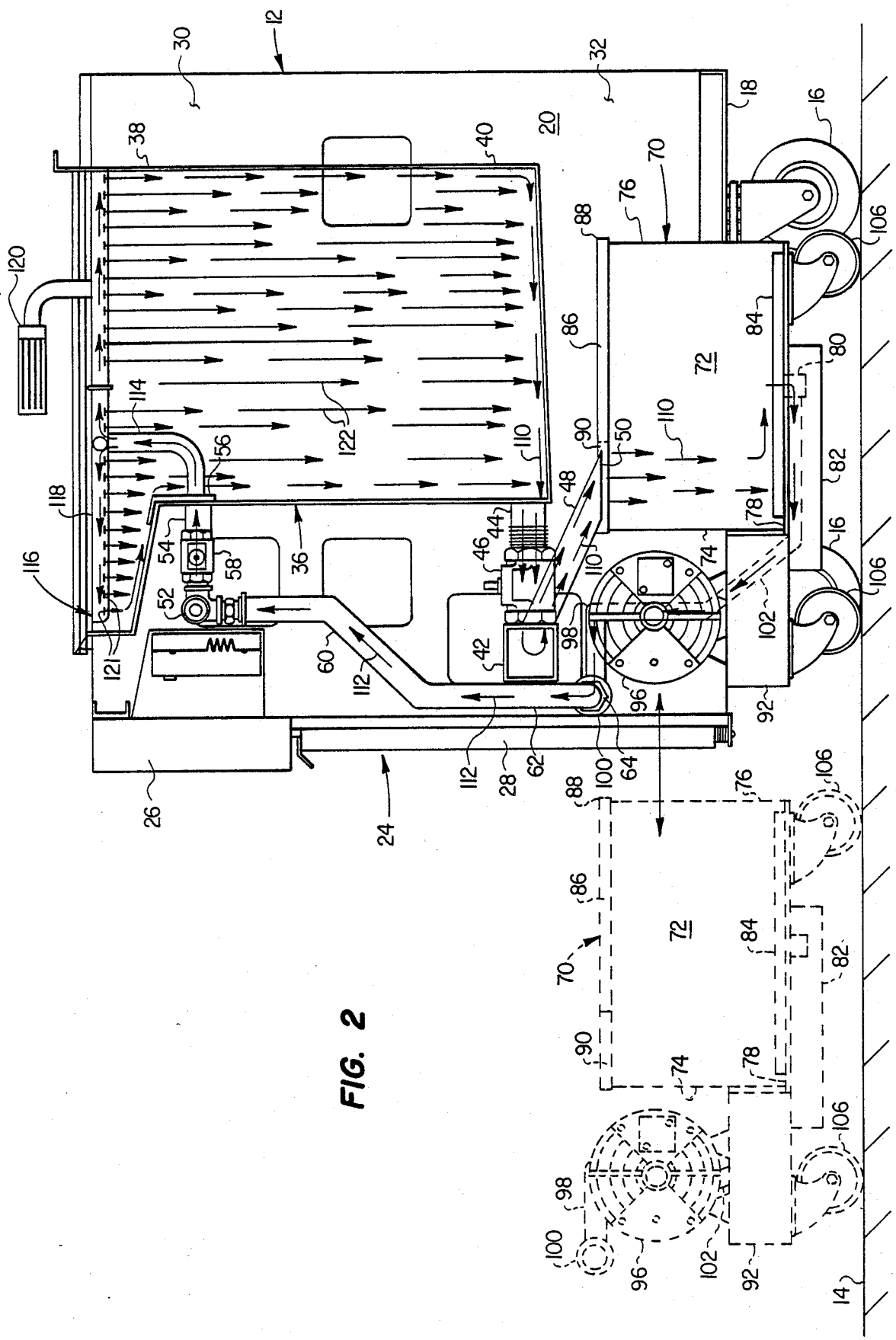
FIG. 2 is a cross-sectional view through the apparatus, partially in elevation, taken generally along line 2—2 of FIG. 1.

As illustrated in FIGS. 1 and 2, the present invention provides a deep fat frying apparatus 10 having incorporated therein a unique cooking fluid filtration system to be subsequently described. Apparatus 10 includes a metal housing 12 which is supportable on a floor 14 by wheels 16 so that the housing can be conveniently rolled from one operating location to another. Housing 12 has an elevated, open lower end 18, left and right side walls 20, 22 (as viewed from the front), and a front side wall portion 24 defined by a side-by-side pair of top mounted control panels 26, and a pair of front access doors 28 disposed beneath the control panels. The housing 12 has an upper internal portion 30 and a lower internal portion 32. With the housing doors 28 in their open position, an access opening 34 is defined, such access opening extending vertically from the floor 14 to the upper end of the lower internal housing portion, rearwardly through the housing 12, and horizontally across most of the interior width of the housing.

Operatively supported in the upper internal housing portion 30 are a side-by-side pair of open-topped, large capacity metal frypots 36 which are adapted to receive a quantity of cooking fluid such as cooking oil or melted lard. Each of the frypots 36 has a heated, upper cooking portion 38 from which a vertically elongated, laterally narrower cold well portion 40 depends. For purposes of illustrative clarity, the frypot heating system, which is of a conventional construction, has not been shown in the drawings, but it will be appreciated that such heating system could be of either a gas heating or electric heating type.

The improved apparatus 10 is also provided with a drainage conduit system for draining cooking fluid from a selected one of the frypots 36 for a cooking fluid filtration process subsequently described herein. The drainage conduit system includes an elongated, generally horizontally disposed hollow drain header member 42 which is positioned in the upper internal housing portion 30 forwardly of the lower ends of the cold wells 40. Drain header 42 has a rectangular cross-section and is operatively connected to the cold wells 40 by drain pipe sections 44 which are connected to the lower ends of the cold wells and are provided with suitable drain valves 46 that may be conventionally operated to drain the cooking fluid in either of the frypots 36 into the drain header 42. An outlet conduit 48 is connected to a longitudinally central portion of the drain header 42, slopes rearwardly and downwardly therefrom, and has an open discharge end 50.

Also positioned within the upper internal housing portion 30, forwardly of the frypots 36, is a supply conduit system which, in a manner subsequently described, is used to return filtered cooking fluid to the frypots. The supply conduit system includes a horizontal supply conduit section 52 which is communicated with the interiors of the upper frypot cooking portions 38 by means of a pair of supply conduit branch lines 54 which are connected to the upper frypot portions 38 at quick-disconnect fittings 56. A pair of return valves 58 are interposed in the branch lines 54 and are operable in a conventional fashion to route filtered cooking fluid into a selected one of the frypots 36. Connected to a right end portion of the horizontal supply conduit 52 as viewed in FIG. 1 is a vertically extending flexible inlet conduit 60 which has a lower end portion 62 that may be selectively moved into and out of the lower internal housing portion 32. The inlet end of the conduit portion 62 is provided with a quick disconnect fitting 64.

The apparatus 10 of the present invention is also provided with a substantially improved cooking fluid filtration and pumping system which is rapidly connectable to the previously described drainage and supply conduit systems, and requires no additional floor space beyond that occupied by the housing 12. The filtration and pumping system includes a cooking fluid receiving container structure 70 having a hollow rectangular container body portion 72 which is laterally elongated (i.e., in a left-to-right direction as viewed in FIG. 1).

Hollow body portion 72 has a front side wall 74, a rear side wall 76, a bottom wall 78, and a drain sump 80 depending from the bottom wall 78 and positioned within a protective shroud structure 82. A cooking fluid filter element 84 is releasably clamped (by a conventional mechanism not illustrated) around its periphery to and extends along the upper surface of the bottom wall 78 across the open upper end of the sump 80. The container body portion 72 has a holding capacity at least equal to, but preferably somewhat larger than, the cooking fluid capacity of one of the frypots 36. A lid 86 is hinged along its rear side edge 88 to the open upper end of the container body 72 and is provided with a laterally centrally positioned inlet opening 90 along its front side edge.

Projecting forwardly from a bottom section of the container body front side wall 74 is a ledge portion 92 which supports a cooking fluid filtration pump 94 and an electric drive motor 96 operatively connected thereto. Pump 94 has an outlet 98 provided with a quick-disconnect fitting 100 thereon. A flexible inlet conduit 102 is extended through the ledge portion 92 and the shroud structure 82, and is connected at its opposite ends to the pump inlet 104 and the drain sump 80.

The fluid receiving container structure 70 is movably supported in an elevated position by small wheels 106 and is configured to be rolled rearwardly from its dotted line position in FIG. 2 into the lower internal housing portion 32 through the access opening 34 to the solid line position of the container structure 70 shown in FIG. 2. With the container structure 70 in this solid line position, it is disposed generally within the vertically projected floor area of the frypots 36, with the container body 72 disposed generally beneath the cold wells 40, and the lid inlet opening 90 disposed directly beneath the drainage conduit system outlet opening 50 to thereby form an operative connection between the container body 72 and the drainage conduit system.

With the container structure 70 rolled inwardly to this position, the filtration and pumping system may be rapidly connected to the supply conduit system simply by securing the quick disconnect fitting 64 on the flexible conduit end portion 62 into the disconnect fitting 100 on the pump outlet. During insertion of the container structure 70 into the lower internal portion of the housing, the flexible conduit end portion 62 may simply be bent out of the way so as not to impede the entry of the container structure. The pump motor 96 may then be simply plugged into a suitable electrical outlet (not shown) disposed within the housing 12 at a convenient location. The cooking fluid filtration and pumping system is then ready for operation in a manner which will now be described.

For purposes of illustration, it will be assumed that the cooking fluid in the left frypot 36 in FIG. 1 is to be drained, filtered and returned to such frypot. To initiate the filtering operation, the left drain valve 46 is opened, thereby permitting a gravity drainage flow 110 of cooking fluid sequentially from the left cold well 40 into the drain header 42, downwardly through the outlet conduit 48, and into the container body 72 through its lid inlet opening 90. After the cooking fluid in the left frypot 36 is drained into the container body 72 in this manner, the left return valve 58 is opened and the pump motor 96 is energized to draw cooking fluid within the container body 74 downwardly into the sump 80 across the filter element 84 to remove particulate food matter from the cooking fluid. The purified cooking fluid entering the sump 82 is drawn upwardly into the pump inlet 104 via the inlet conduit 102. The filtered cooking fluid is then pumped upwardly through the supply conduit system as indicated by the arrows 112.

The filtered returning cooking fluid passing inwardly through the left return valve 58 (FIG. 1) is flowed into the inlet portion 114 of a drop-in cooking fluid shower structure 116 removably positioned within the upper end of the left frypot 36. Shower structure 116 is of the type illustrated and described in U.S. Pat. No. 4,259,567 to Moore et al to which reference may be made for further detail relating thereto. However, for sake of completeness, the shower structure 114 will be briefly described herein.

The inlet portion 114 is removably connected to the frypot quick disconnect fitting 56 (FIG. 2) and communicates at its upper end with a rectangular header section 118 that extends around the interior sidewall surface of the left frypot 36 at its upper end. Header 118 has a pair of upwardly projecting handles 120 secured thereto and is provided around its lower side surface with a spaced series of small discharge openings 120 (FIG. 2).

Accordingly, when cooking fluid is forced upwardly into the header 118, it is discharged downwardly through the openings 120 in the form of small diameter cooking fluid jets 122 which flow along the interior sidewall surfaces of the upper frypot section 38 and dislodge food particles adhering thereto so that they may be flowed downwardly into the well 40 and then transferred into the container body 74 to be trapped by the filter element 84. Thus, with the left drain and return valves 46, 48 in their open position, a continuous cleansing flow of cooking fluid through the left frypot 36 and the filtering and pumping apparatus may be maintained until the circulating cooking fluid is sufficiently free of particulate food matter. At this point, the left drain valve 46 may be closed to permit the pump 94 to completely refill the frypot. The left return valve 58 may then be closed and the left frypot returned to its cooking duties. This same continuous filtration process may then be repeated for the cooking fluid disposed in the right frypot 36.

When a particular batch of cooking fluid in either of the illustrated frypots 36 has reached the end of its useful life, it can simply be drained into the container body 74 by opening the appropriate drain valve 46, and the container structure 70 can be disconnected from its power source, and from the supply conduit system, and rolled outwardly from beneath the frypots so that the used cooking fluid can be dumped and the container structure 70 be cleaned.

It can be seen that since the container structure 70 fits beneath the frypots 36 within the housing 12, it requires no more floor space than that occupied by the frypot housing. This leaves both the left and right sides of the housing 12 (as viewed in FIG. 1) free for connection to another frypot housing structure to form an enlarged, "ganged" frypot housing structure with, for example, six frypots—two additional frypots on each side of the illustrated pair. All that is required to effect this frying capacity enlargement is to extend the drain header 42 and the supply conduit outwardly through the opposite sidewalls 20, 22 of housing 12 and suitably connect them to the added frypot sections.

An example of this expansion is schematically illustrated in phantom in FIG. 1, in which an additional floor mounted frypot housing 12$_a$, having a representative single frypot 36$_a$ therein, is positioned against the left side wall 20 of housing 12. Extensions 42$_a$ and 52$_a$ of the drain header 42 and the supply conduit 52 are carried outwardly through the housing side wall 20 and operatively connected to the drain valve 46$_a$ and return valve 58$_a$, respectively, of the additional frypot 36$_a$, thereby permitting the container structure 70 to serve all of the three illustrated frypots.

In addition to this expansion flexibility permitted by the movable container and pump structure 70, it will also be appreciated that a single structure 70 can be used to provide filtration service to additional sets of frypots positioned at various locations in the cooking facility simply by rolling it across the floor, positioning it below the frypots to be drained and filtered, and making the quick connections previously described.

Finally, the movable structure 70 offers increased operational safety compared to "wand" type drainage containers in which a flexible tube must be inserted into the open upper end of a frypot to effect drainage of its hot cooking oil.

The foregoing detailed description is to be clearly understood as being given by way of illustration and example only, the spirit and scope of the present invention being limited solely by the appended claims.

What is claimed is:

1. Deep fat frying apparatus comprising:

a floor supportable housing having a pair of opposite side walls, a front wall, an open lower end, a lower internal portion, an upper internal portion positioned directly above said lower internal portion, and means for defining a horizontally facing access opening through said front wall into said lower internal portion, said access opening extending from the floor to the upper end of said lower internal portion;

a pair of frypots each adapted to receive and heat a cooking liquid in which food items may be cooked, said pair of frypots being mounted in a closely adjacent side-by-side relationship within said upper internal portion of said housing, each of said frypots being sized to hold approximately the melted product of a fifty pound block of cooking lard or an equivalent volume of cooking oil and having an upper cooking portion with a narrowed cold well portion depending therefrom, each of said upper cooking portions having a width and an outer side wall positioned closely adjacent one of said side walls of said housing, whereby the side-to-side floor space dimension of said housing is not substantially greater than the sum of the widths of said upper cooling portions of said pair of frypots;

drainage conduit means, positioned in said upper internal portion of said housing, for draining cooking liquid from said well portions of said frypots, said drainage conduit means having inlets operatively connected to said well portions to receive cooking liquid therefrom, and an outlet for discharging the received cooking fluid;

drainage valve means interposed in said drainage conduit means and operative to selectively initiate and terminate cooking fluid draining from said well portions outwardly through said drainage conduit means;

supply conduit means for flowing cooking liquid from a source thereof into said frypots, said supply conduit means having an upper portion disposed within said upper internal portion of said housing and having an outlet communicating with the interiors of said upper cooking portions of said frypots, and an inlet end portion extendable downwardly into said lower internal portion of said housing adjacent said access opening;

supply valve means interposed in said supply conduit means and operative to selectively permit or preclude flow of cooking fluid into said frypots through said supply conduit means; and cooking fluid filtration means for receiving cooking fluid discharged from said outlet of said drainage conduit means, filtering the discharged cooking fluid, and returning the filtered cooking fluid to said frypots through said supply conduit means, said cooking fluid filtration means including:

a wheel-supported cooking fluid receiving container having a top opening, a bottom wall from which a drain sump depends, a front side portion, and a rear side portion, said cooking fluid receiving container being sized to receive and hold the entire cooking fluid content of either of said pair of frypots, a cooking fluid filter element operatively carried by said cooking fluid receiving container, a pump and associated drive motor carried by said cooking fluid receiving container for movement therewith, said pump having an inlet communicating with the interior of said drain sump, and an outlet, and cooperating quick-disconnect means on said pump outlet and said inlet end portion of said supply conduit means for removably connecting said pump outlet to said inlet end portion of said supply conduit means, said cooking fluid receiving container being rearwardly rollable through said access opening into said lower internal portion of said housing to position said container directly beneath said cold well portions of said frypots, position said open top of said container beneath said outlet of said drainage conduit means, and position said pump outlet adjacent said inlet end portion of said supply conduit means for connection thereto, said container being forwardly rollable outwardly through said access opening for periodic cleaning purposes, whereby said cooking fluid filtration means may be operatively associated with the balance of said deep fat frying apparatus without requiring additional floor space beyond that occupied by said housing, and said pump and its associated drive motor, with said container moved outwardly from said housing means, are readily accessible for maintenance, repair and replacement purposes.

2. The apparatus of claim 1 wherein:

said housing is wheel supported to facilitate movement thereof to alternate operating locations.

3. The apparatus of claim 1 further comprising:

shower header means for converting cooking fluid returned to said frypots means into a series of small cooking fluid jets which sweep downwardly along interior sidewall surfaces of said upper cooking portions of said frypots to dislodge adhered food particles therefrom, said shower header means being removably insertable into the upper end of said frypots and releasably connectable to said supply conduit means at the juncture thereof with said frypots.

4. Reduced floor space deep fat frying and cooking fluid filtration apparatus comprising:

floor supportable housing means having a width extending between opposite first and second vertical side walls thereof, a front wall, an open lower end, a lower internal portion, an upper internal portion positioned directly above said lower internal portion, and means for defining a horizontally facing access opening through said front wall into said lower internal portion, said access opening extending from the floor to the upper end of said lower internal portion;

first and second large capacity metal frypots operatively supported within said upper internal portion of said housing means, each of said frypots being adapted to receive and heat at least the melted product of a fifty pound block of cooking lard or an equivalent volume of cooking oil in which food items may be fried, and having an open-topped, heated upper cooking portion for receiving the food items, and a narrowed, unheated cold well portion depending from said cooking portion said frypots being positioned in a relatively closely adjacent side-by-side relationship in a manner such that the width of said housing means, and thus their side-to-side floor space requirement, is not substantially greater than the sum of the widths of said upper cooking portions of said frypots;

drainage conduit means, positioned in said upper internal portion of said housing means, for draining cooking liquid from said frypots, said drainage conduit means having a pair of inlet portions operatively connected to said cold well portions to receive cooking liquid therefrom, and an outlet for discharging the received cooking fluid;

drainage valve means interposed in said inlet portions of said drainage conduit means and operative to selectively initiate and terminate cooking fluid drainage from a selected one of said cold well portions outwardly through said drainage conduit means;

supply conduit means for flowing cooking liquid from a source thereof into said frypots, said supply conduit means having an upper portion disposed within said upper internal portion of said housing means and having a pair of outlet portions communicating with the interior of said upper cooking portions of said frypots and an inlet end portion extendable downwardly into said lower internal portion of said housing means adjacent said access opening;

supply valve means interposed in said outlet portions of said supply conduit means and operative to selectively permit or preclude flow of cooking fluid into a selected one of said frypots through said supply conduit means; and cooking fluid filtration means for receiving cooking fluid drained from a selected one of said frypots and discharged from said outlet of said drainage conduit means, filtering the discharged cooking fluid, and returning the filtered coking fluid to said selected one of said frypots through said supply conduit means, said cooking fluid filtration means including:

a high capacity, wheel-supported cooking fluid receiving container having a top opening, a bottom wall from which a drain sump depends, a front side portion, and a rear side portion, said container having an internal volume sufficient to hold at least the entire cooking fluid content of one of said large capacity frypots, a cooking fluid filter element operatively carried by said container for filtering cooking fluid drained thereinto from said frypots, a pump and associated drive motor externally mounted on said front side portion of said cooking fluid receiving container for movement therewith, said pump having an inlet communicating with the interior of said drain sump, and an outlet, and cooperating quick-disconnect means on said pump outlet and said inlet end portion of said supply conduit means for removably connecting said pump outlet to said inlet end portion of said supply conduit means;

said high capacity cooking fluid receiving container being rearwardly rollable through said access opening into said lower internal portion of said housing to position said container directly beneath said cold well portions of said frypots, position said top opening of said container beneath said outlet of said drainage conduit means, and position said pump outlet adjacent said inlet end portion of said supply conduit means for connection thereto, said container being forwardly rollable outwardly through said access opening for period cleaning purposes, whereby said cooking fluid filtration means may be operatively associated with the balance of said apparatus without requiring additional floor space beyond that occupied by said housing means, and said pump and its associated drive motor, with said container moved outwardly from said housing means, are readily accessible for maintenance, repair and replacement purposes.

5. The apparatus of claim 4 wherein:

said drainage conduit means include an elongated, generally horizontally disposed enlarged drainage header interposed between said cold well portions and said outlet, and said outlet is disposed on a longitudinally central portion of said drainage header.

6. The apparatus of claim 4 wherein:

said housing means are wheel supported to facilitate movement thereof to alternate operating locations.

7. The apparatus of claim 4 further comprising:

shower header means for converting cooking fluid returned to a selected one of said frypots into a series of small cooking fluid jets which sweep downwardly along interior sidewall surfaces of the upper cooking portion of the selected frypot to dislodge adhered food particles therefrom, said shower header means being removably insertable into the upper end of the selected frypot and releasably connectable to said supply conduit means at the juncture thereof with the selected frypot.

8. The apparatus of claim 4 wherein:

said drainage conduit means include a generally horizontally disposed rain header extending generally perpendicularly to said first and second side walls, said supply conduit means include a generally horizontally disposed supply conduit extending generally perpendicularly to said first and second side walls, and said apparatus further comprises an additional floor mounted frypot housing positioned adjacent said first side wall of said housing means and having at least one additional frypot operatively supported therein, and extensions of said drain header and said supply conduit passing outwardly through said first side wall and operatively connected to said at least one additional frypot.

* * * * *